H. H. SUPLEE.
AIRPLANE STRUCTURE.
APPLICATION FILED DEC. 5, 1917.
1,373,153.
Patented Mar. 29, 1921.
3 SHEETS—SHEET 3.
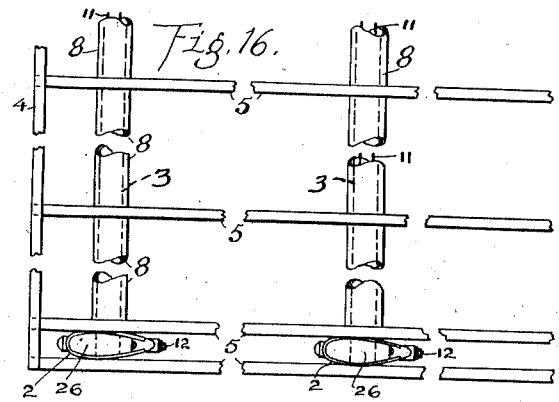
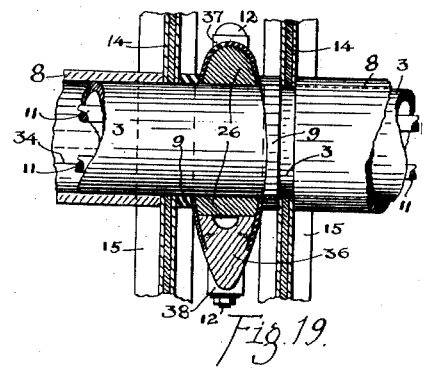
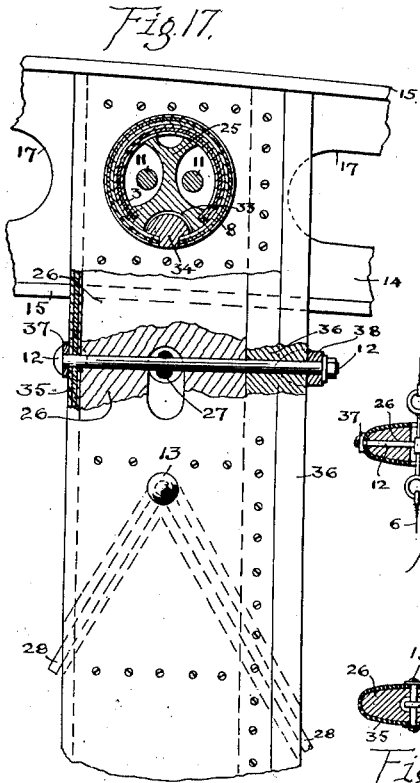
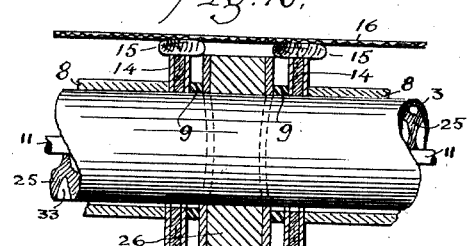
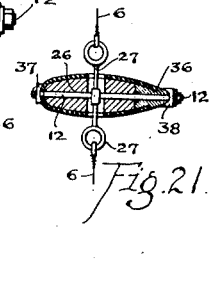
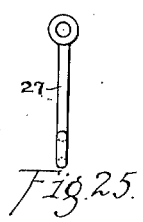
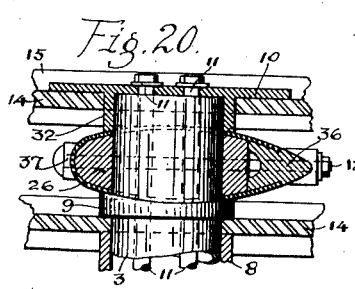
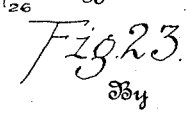
Henry Harrison Suplee, Inventor
By N. S. Austutz
Attorney

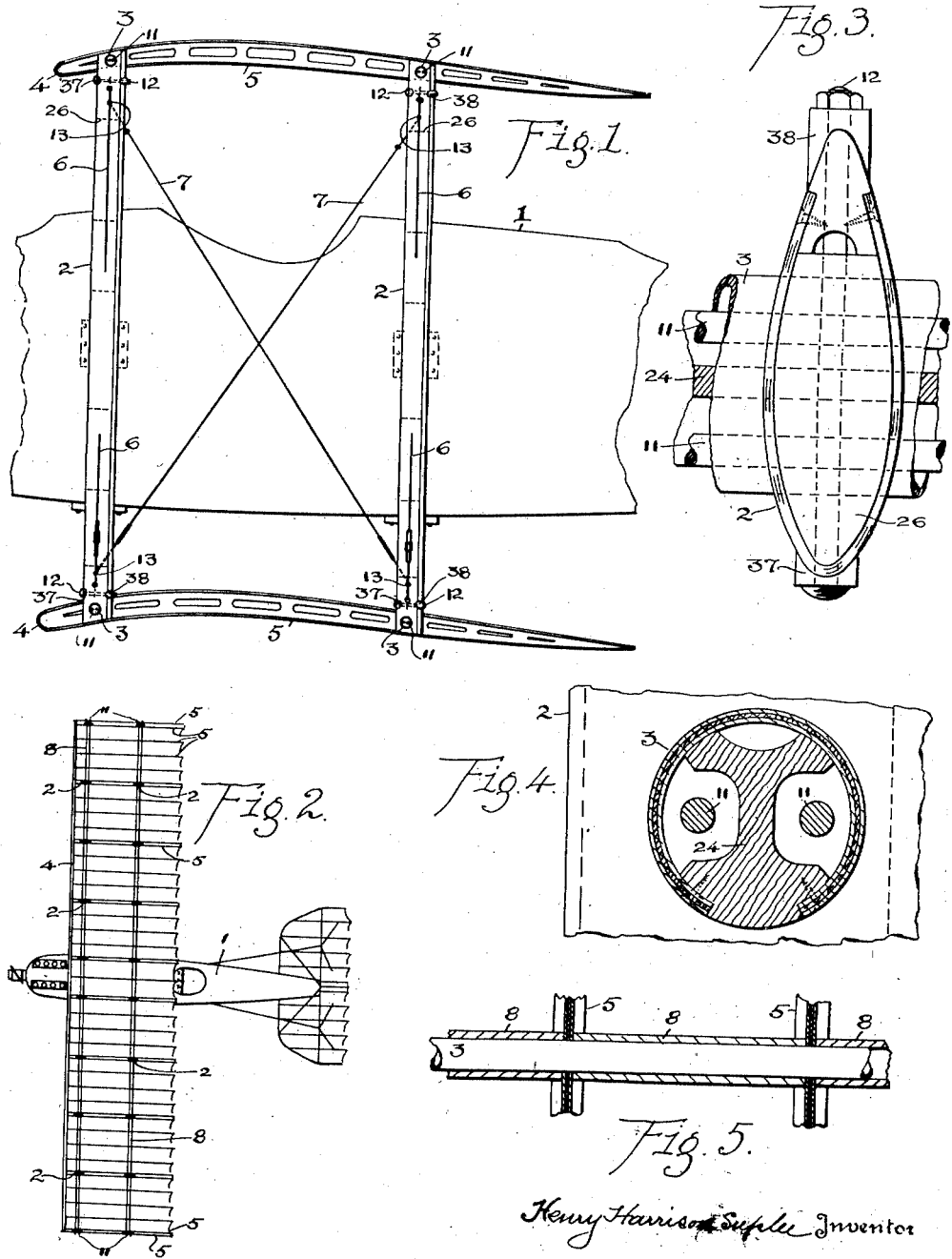

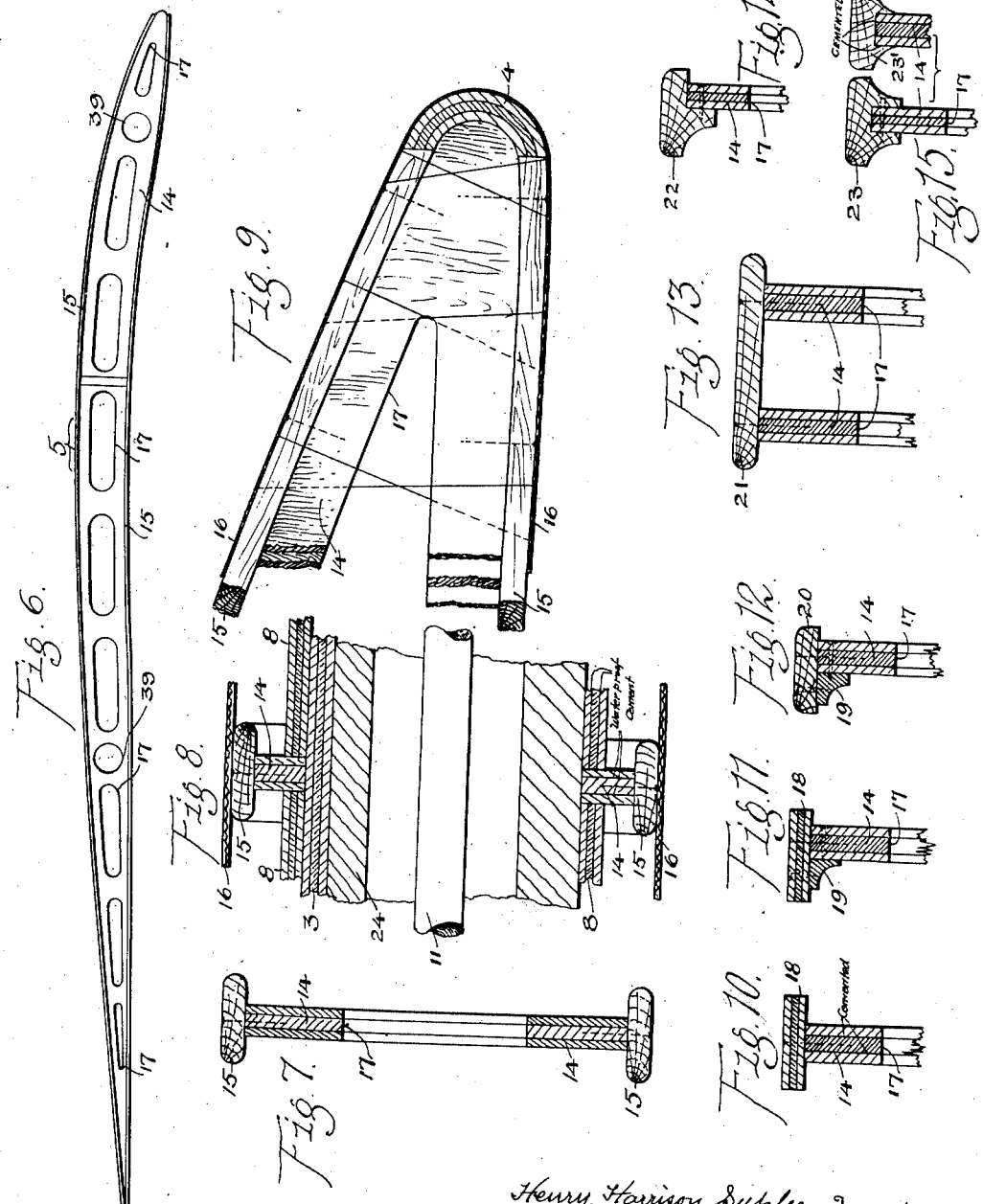

UNITED STATES PATENT OFFICE.

HENRY HARRISON SUPLEE, OF NEW YORK, N. Y., ASSIGNOR TO DODGE MANUFACTURING COMPANY, OF MISHAWAKA, INDIANA, A CORPORATION OF INDIANA.

AIRPLANE STRUCTURE.

1,373,153.  Specification of Letters Patent.  Patented Mar. 29, 1921.

Application filed December 5, 1917. Serial No. 205,547.

*To all whom it may concern:*

Be it known that I, HENRY HARRISON SUPLEE, a citizen of the United States, residing at New York, in the county of New York and State of New York, have invented certain new and useful Improvements in Airplane Structures, of which the following is a specification.

My invention relates to improvements in airplane structure and it appertains more particularly to the special features embodied in the annexed claims.

The purpose of this invention is to provide an airplane wing structure that will secure the greatest strength for the least weight; that at the most vital points will have a factor of safety beyond that ordinarily attained in airplane practice; that may be readily standardized; that can be quickly assembled; that can be readily disassembled for shipping purposes; and that shall attain to a high efficiency in production and use without making large demands for seasoned spruce wood for spars, struts, etc.

With these and other ends in view I illustrate in the accompanying drawings such instances of adaptation as disclose the broad underlying features without limiting myself to the specific details shown.

Figure 1 is a side elevation of an assembly of struts, ribs, spars and fuselage in more or less diagrammatic relation.

Fig. 2 is a plan view in reduced scale of an airplane skeletonized, with ribs and struts assembled on the spars.

Fig. 3 is a plan view of a strut "threaded" onto a spar.

Fig. 4 is a side elevation of Fig. 3 exemplifying a rib separator and spar in section.

Fig. 5 is a detached plan view in section of ribs, separators and a spar in assembled relation.

Fig. 6 is a side elevation of a composite rib with air-line contour.

Fig. 7 is an elevation in cross section of Fig. 6 through one of the openings formed in the web to reduce the weight of the entire rib.

Fig. 8 is an elevation in cross section of a rib, a spar, separators with tie rods in elevation.

Fig. 9 is an enlarged side elevation of the front end of a rib, with nose piece and linen attached.

Fig. 10 exemplifies a rib form composed of laminated web and flanges.

Fig. 11 instances a structure similar to Fig. 10 with a bracketed mold beneath the flange on one side of the web.

Fig. 12 instances a solid flange with a bracketed support.

Fig. 13 shows a wide form of flange with twin ribs.

Fig. 14 illustrates a solid rabbetted flange secured to a laminated web.

Fig. 15 shows a grooved flange attached to a laminated web.

Fig. 16 shows a group of inter-ribs and spar ribs assembled on their spars.

Fig. 17 is an enlarged side elevation partly in section of an upper end of a strut, a spar, a rib and the stay wire fastenings.

Fig. 18 is a transverse elevation generally in section of Fig. 17.

Fig. 19 is a plan view in section of a pair of ribs in their assembled relation to a spar and strut.

Fig. 20 is a plan view in section of an end rib with a bearing plate for the tie rods.

Fig. 21 is a reduced plan in section of a strut showing a fastening means for the transverse stay wires.

Fig. 22 is a view similar to Fig. 21 but serving for the longitudinal stay wires.

Fig. 23 is an alternative form of stay wire fastening in which a stirrup is used for the transverse wires.

Fig. 24 is a plan view of a strut with a stirrup fastening for longitudinal stay wires.

Fig. 25 shows one of the stay wire fasteners.

In carrying my invention into practice, I may utilize any equivalents desired as substitutes for the details instanced in the accompanying drawings without departing from the spirit of my invention. The broad feature of the invention lies in assembling correlated structural elements onto main transverse members and tying parts together in any suitable manner so that all the parts are held against displacement by inclusive means which engage the extreme lateral members of the structure and by compression, etc., firmly hold the intermediate parts to withstand the stresses of the most exacting service.

Heretofore, airplane structures have been made with metallic connections between struts and spars, etc., dependence being placed on small bolts, etc., to secure the parts to each other. Spars and struts and ribs have been made of solid wood, requiring the highest grade of material obtainable. Notwithstanding the specific strength of the various parts, still the weakness of the joining members which unite struts and spars remains an everpresent shortcoming, tritely illustrating the old saying that "a chain is no stronger than its weakest link."

This invention is of commanding importance in that a greater degree of strength is secured with minimum weight while using materials more economically available than has hitherto been possible. By constructing the various parts, ribs, spars, struts, etc., of laminated elements great efficiency is reached in production and in actual service. This leads to a thorough standardization of the main parts of airplane structures, which, in turn, secures the utmost despatch in assembling units to meet the pressing demands of urgent and unexpected service conditions. A further advantage of marked value is found in the interchangeability of the parts so that for military purposes, in case of planes becoming disabled, the undamaged parts are instantly available for use in speedy re-building operations because the parts can be so quickly disassembled without destroying their basic coöperativeness.

Any desired form of fuselage may be combined with my airplane composite frame work and the method of support by, and attachment to the struts are matters of detail which do not enter into the present invention. The main members of my structure are the spars 3 which extend unbroken from one side to another of each wing. These spars are shown of tubular form in which a laminated member almost completes a circle. An inner reinforcement, 24 of Fig. 4 or 25 of Fig. 17, may be used to join the two edges together. If desired, grooves may be formed on each side of the center portion of this reinforcement in which tie rods 11 may lie to prevent any vibration being set up in such rods. The reinforcement 34 (Fig. 17) of the spacing separator sleeves 8 when they are assembled on the spars 3 projects into a groove 33 of the spar reinforcement.

The sleeves 8 are also laminated to secure maximum strength with minimum weight. The two edges of the laminations exemplified by 3 and 8 are secured to the lengthwise reinforcements, of any desired form, 24 and 25 or their substitutes by nails, screws, etc.

The spars 3 support the ribs 5 and the struts 2. A rib 5 is placed on each side of each strut and as many between pairs of struts as are deemed necessary, as shown in Figs. 2 and 16. In order to hold the ribs 5 and struts properly positioned on the spars, tubular spacers 8 are placed over the spars between adjacent ribs 5, and rings 9 are also placed on the spars between the struts and the ribs so as to avoid cutting away a part of one of the flanges 15 of each rib placed alongside of a pair of struts.

When all the sleeves 8, struts 2, ribs 5, and rings 9, are assembled onto spars 3, end plates 10 having annular flange 32 that enters an enlarged opening 39 formed in the outermost ribs 5 so as to encircle the extreme ends of the spars, are placed in position, then a pair of tie rods 11 are placed inside of spars 3, or a single rod in each spar may be used instead. These rods, by the use of nuts, etc., very tightly and rigidly hold all the parts assembled on the spars, in compression. The end plates 10 abut webs 14 of ribs 5 thus insuring the operative integrity of the entire structure.

The ribs 5, in the main, comprise webs 14 that have elongated openings 17 formed approximately as shown in Fig. 6 to reduce the weight without sacrificing strength. At 39, circular openings are formed to receive spars 3. The cross section of variants of the flanges 15 are shown in Figs. 10 to 15 inclusive wherein 18 represents a laminated flange which in Fig. 11 projects more on one side of the web than in the other and a molding 19 is secured under the extra projection. In Fig. 12 the molding 19 is combined with a solid flange member 20 somewhat similar to flanges 15 of Fig. 7. Whenever for any purpose twin ribs are to be used a pair of webs 14 may be joined top and bottom by widened flanges 21 shown in Fig. 13. A rabbeted flange 22 is exemplified in Fig. 14. This combines the elements 19 and 20 of Fig. 12 in a single solid piece. A solid flange 23 with a central groove is instanced in Fig. 15. As shown this is fastened to the web 14 by side screws but very satisfactory results are attained by making a shallow groove with delicate filleted side walls that terminate against the sides of web 14 without a large projecting edge. In such an adaptation the parts may be simply cemented to each other without the use of nails, screws, etc.

Ribs 5 are covered with linen 16 in the usual manner somewhat as exemplified in Fig. 9. In order that the linen along the front edges of the wings may be kept straight a nose piece 4 that may be laminated is placed the entire length of each wing. These may be secured by nails or screws at a few points to prevent their shifting endwise. The linen 16 is stretched tautly over the same which combined with the rounded end of web 14 specially shown in Fig. 9 as entering the concave side of the nose pieces serves to effectively hold them against any shifting perpendicular to their length.

Holes are formed near the ends of struts 2 to receive spars 3 and to reinforce these parts solid members 26 are inserted between the laminated sides 35 and longitudinal fillers 36 as specially shown in Figs. 17 and 18. These extend some distance into struts 2 from each end so to also form supports for the transverse and longitudinal stay wires 6 and 7 respectively.

Anchor bolts 12 and 13 pass through struts 2 as exemplified in Figs. 17, 18, 21 and 22. Twin eye bolts 27 are secured on fastenings 12 or single bolts may be placed side by side. Their ends pass out through holes formed in the strut. Eye bolts 28 are held by fastening 13. Stay wires 6 are secured to fasteners 27 through turn buckles in the usual well known manner. Whenever it is desired to use an alternative means of fastening the stay wires 6 and 7 to the strut 2 stirrups 30 for the transverse stays shown in Figs. 23 and 31 for the longitudinal stays shown in Fig. 24 may be used.

It is however understood that the broad scope of the invention is not in any sense limited to these specific adaptations as they may be varied according to the special requirements of different practical uses. In order that the heads and nuts of bolts 12 may not injure the struts washers 38 and 37 may be specially shaped to abut the faces of the struts. Likewise bolts 13 may also have special washers whose inner face conforms to the contour of the cross sectional stream line curvature of the struts. It is immaterial as to the number of wings that are used because the assemblage of spars, etc., would be quite similar on a monoplane structure wherein the lower ends of the struts are secured directly to the fuselage or to triplanes, etc.

The fuselage 1 and the general structure herein exemplified are provided with the usual undersupports for the landing gear. It will be apparent that a most efficient type of structure is embodied in this invention, one that is elastic enough to stand considerable rough usage without serious damage and one which is susceptible of extreme refinements in standardizing the detail steps of manufacture.

What I claim is,

1. In airplane structures, a skeletonized frame work comprising separate standardized ribs, struts and spacers of laminated materials, a plurality of spars for supporting the ribs, struts and separate spacers in any desired group relation, means within and extending throughout the length of the spars for holding the ribs, struts, and spacers against endwise displacement on the spars, and diagonal stay wires connecting the opposite ends of a strut on one spar with adjacent struts on the same spar and one or more struts on another spar so as to retain all the parts in their required working alinement with respect to each other.

2. In airplane structures, a pair of spars, ribs, struts and rib spacers assembled thereon, and means extending axially throughout the length of the spars adapted to hold the parts in service positions with respect to each other.

3. In airplane structures, composite strut members of substantial stream line cross section formed of a laminated bent-up sheet with a hollow center, suitable fillers inserted at each end, lengthwise reinforcements placed between the adjacent edges of the sheet and within the same, the sides of the strut and the fillers having openings formed transversely thereof the same being adapted to receive spars, and fastening means near the ends of the struts to which stay wires may be attached.

4. In airplane structures, a pair of spars, groups of ribs assembled in pairs on the spars, struts supported by the spars while placed between pairs of adjacently positioned ribs, other ribs assembled on the spars between the aforementioned groups of ribs, spacers between adjacent ribs and between ribs and struts, and means extending parallel with the spars adapted to hold the parts in assembled relation thereon.

5. A composite strut member formed of a bent-up sheet of laminated material into a stream line cross section, a longitudinal reinforcement to which said sheet is attached, end fillers within the bent-up sheet at both ends thereof said fillers and the sheet having transverse holes therethrough, spar members passing through such holes, and means for holding the parts in assembled relation.

In testimony whereof I affix my signature in the presence of two witnesses.

HENRY HARRISON SUPLEE.

Witnesses:
ARTHUR E. BRISTOL,
ROSE B. DIMOND.